UNITED STATES PATENT OFFICE.

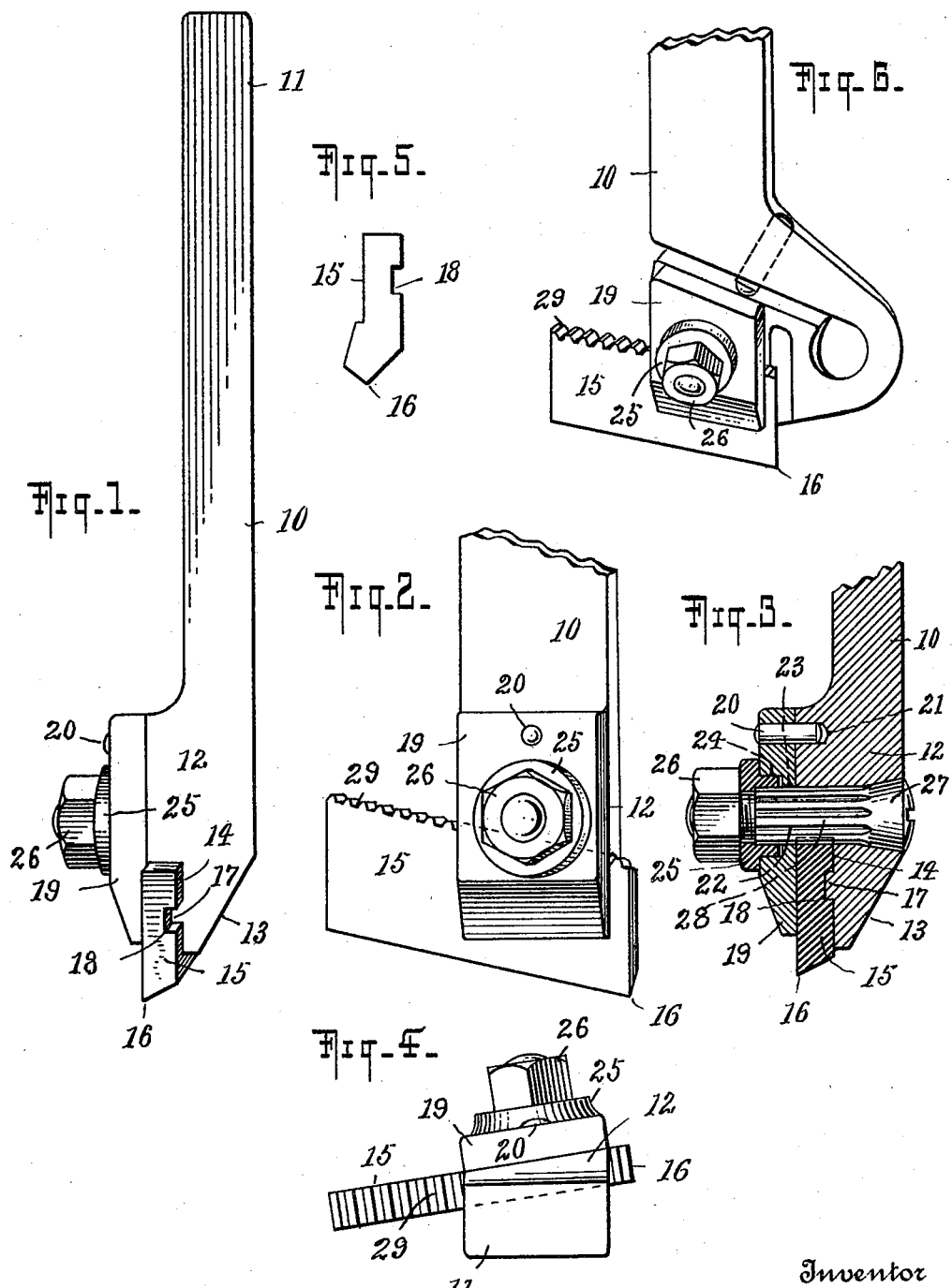

FRANK O. HOAGLAND, OF BRIDGEPORT, CONNECTICUT, ASSIGNOR TO THE BILTON MACHINE TOOL COMPANY, OF BRIDGEPORT, CONNECTICUT, A CORPORATION OF CONNECTICUT.

COMBINED TOOL-HOLDER AND CUTTER.

1,383,630.   Specification of Letters Patent.   Patented July 5, 1921.

Application filed December 29, 1919. Serial No. 347,954.

*To all whom it may concern:*

Be it known that I, FRANK O. HOAGLAND, a citizen of the United States, and resident of Bridgeport, in the county of Fairfield and State of Connecticut, have invented certain new and useful Improvements in Combined Tool-Holders and Cutters, of which the following is a specification.

This invention relates to new and useful improvements in combined adjustable cutters and holders for machine tools.

The object of the invention is to provide a combined cutter and holder of the above class which is particularly well adapted for thread cutting and other classes of work; to design the holder and cutter so that the latter may be easily inserted in and removed from the holder and likewise adjusted with relation to the holder and firmly secured in position; further to accomplish the above objects in a way which will greatly facilitate regrinding and sharpening of the cutters from time to time, and whereby the cutter may be used down to a short length and still be held firmly in the holder.

With these and other objects in view the invention resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Similar characters of reference denote like or corresponding parts throughout the several figures of the accompanying drawings forming a part of this specification, and upon which, Figure 1 is an elevational view of my novel combined holder and cutter;

Fig. 2 is a perspective view of the holder and cutter of Fig. 1, with the shank of the holder broken away;

Fig. 3 is a central vertical section of the holder and cutter of Figs. 1 and 2;

Fig. 4 shows an end view of the cutter and holder, as when looking down on Fig. 2;

Fig. 5 is an elevational view of a slightly modified form of cutter; and

Fig. 6 is a perspective view of my improved cutter applied to a goose neck form of holder.

Referring in detail to the characters of reference marked upon the drawings, 10 represents the cutter holder having a shank 11 and a thickened head portion 12. The lower rear side 13 of the head is preferably beveled off as shown to form a clearance for the tool. The lower portion of the face of the head is cut away to form a pocket 14 to receive the cutter 15. The walls of this pocket are formed at an incline with reference to the side portions of the head of the holder, to position the cutter crosswise therein and at an incline to insure a clearance to both sides of the cutting point 16 which avoids the necessity of grinding for a clearance on the tool point. A spline 17 is formed on the inner face of the head of the holder and is disposed crosswise and inclined to conform to the incline of the upper wall of the pocket, and serve to receive the way 18 cut in the back of the cutter which is adapted to be moved backward and forward in the pocket and upon the spline for its longitudinal adjustments.

A clamping plate 19 is provided to fit upon the face of the head of the holder and serves to cover and engage a portion of the face of the cutter in a manner to hold the same against the inner side of the pocket and spline in the head of the holder. A pin 20 is carried by the plate and is positioned in a hole 21 of the head to retain the clamping plate in vertical alinement with the axis of the pinion 22. This clamping plate is further provided with a hole 23 therethrough having an annular enlargement 24 to receive a collar 25 mounted upon the threaded end of the above mentioned pinion 22. A clamping nut 26 is mounted upon this threaded end of the pinion and serves to engage the collar and to clamp the plate 19 against the cutter.

The pinion 22 is provided with an enlarged tapered head 27 which for the most part is countersunk in the back of the head of the holder, and its outer end is rounded and slotted to serve for the engagement of a screw driver. This tapered head effectively engages the tapered hole in the head when the nut 26 is tightened in manner to firmly hold the cutter in position. The teeth 28 in the peripheral portion of the pinion extends longitudinally to engage a rack 29 formed in the upper edge portion of the cutter and whereby the latter is moved longitudinally backward and forward in the pocket of the holder guided by the spline, when the pinion is turned within the holder and plate. From this construction it will be apparent that as soon as the cutter is adjusted to the position desired the nut upon the threaded end of the pinion may be tightened and the plate clamped upon the cutter to firmly secure the same in position. By reason of this form of construction the cutter which is obviously made of expensive steel, can be sharpened and reset from time to time and used down to short lengths thus causing a great saving in the cost of cutters.

Having thus described my invention, what I claim and desire to secure by Letters Patent, is—

1. A tool holder comprising a head having a recess in one side and a hole therethrough, a cutter positioned at an incline in the recess and having a toothed upper edge portion forming a rack, a pinion having a tapered head positioned in the holder and engaging the rack of the cutter, a clamping plate positioned on the head of the holder to engage the face of the cutter, means to guide the cutter at an angle when operated by the pinion, and means to draw the head of the pinion in the holder and to clamp and secure the cutter in position.

2. A combined tool holder and cutter, comprising a head having a recess formed in one side and an incline spline formed in the side wall thereof, a cutter positioned in the recess and having a rack and a groove to receive the spline, a pinion positioned in the holder to engage the toothed rack of the cutter, a clamping plate positioned on the face of the head of the holder to engage the cutter, a collar seated against the plate, and a nut mounted upon the threaded end of the pinion to engage the collar and clamp the plate against the cutter.

3. A tool holder comprising a head having a hole therethrough and a recess intersecting the hole, a cutter positioned in the recess and having a toothed upper edge portion forming a rack, a pinion positioned in the hole to engage the rack of the cutter, and having a threaded end portion, an attachable clamping plate positioned on the pinion to engage the face of the cutter, a spline on the holder to guide the cutter when operated by the pinion, and means upon the pinion to lock the same in its adjusted positions and to clamp and hold the cutter.

4. A combined tool holder and cutter, comprising a head having a recess formed in one side and an incline spline formed in the side wall thereof, a cutter positioned in the recess and having a groove to receive the spline, a pinion positioned in the holder to engage the cutter and having means for turning the same, a clamping plate positioned on the threaded end pinion to engage the cutter, a collar also mounted on the pinion and seated against the plate, and a nut mounted upon the threaded end of the pinion to engage the collar and clamp the plate against the cutter.

Signed at Bridgeport in the county of Fairfield and State of Connecticut this 23rd day of December, A. D. 1919.

FRANK O. HOAGLAND.

Witnesses:
ELBERT O. HULL,
LILLIAN M. ALLING.